United States Patent
N et al.

(10) Patent No.: US 11,983,668 B2
(45) Date of Patent: May 14, 2024

(54) SYSTEMS AND METHODS FOR INVENTORY COLLECTION IN A MANAGEMENT CONTROLLER

(71) Applicant: Dell Products L.P., Round Rock, TX (US)

(72) Inventors: Ravishankar Kanakapura N, Bangalore (IN); Shrinidhi Katte, Bangalore (IN); Sachin Apagundi, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 317 days.

(21) Appl. No.: 17/516,201

(22) Filed: Nov. 1, 2021

(65) Prior Publication Data

US 2023/0134214 A1 May 4, 2023

(51) Int. Cl.
*G06F 17/00* (2019.01)
*G06F 11/30* (2006.01)
*G06F 16/22* (2019.01)
*G06Q 10/087* (2023.01)

(52) U.S. Cl.
CPC ....... *G06Q 10/087* (2013.01); *G06F 11/3051* (2013.01); *G06F 16/2255* (2019.01)

(58) Field of Classification Search
CPC .......... G06F 16/2255; G06F 11/3051; G06Q 10/087
See application file for complete search history.

(56) References Cited

U.S. PATENT DOCUMENTS

| | | | |
|---|---|---|---|
| 11,048,551 B2* | 6/2021 | Kozlowski | G06F 21/6209 |
| 11,341,053 B2* | 5/2022 | Chandrasekhar | G06F 13/4282 |
| 11,675,759 B2* | 6/2023 | Russell | G06F 9/45533 707/695 |
| 2017/0249683 A1* | 8/2017 | Yadav | G06F 16/2455 |
| 2020/0050448 A1* | 2/2020 | Gupta | G06F 16/2455 |
| 2021/0044575 A1* | 2/2021 | Kong | H04L 9/3268 |
| 2021/0142264 A1* | 5/2021 | Curlee | G06Q 10/087 |
| 2022/0207186 A1* | 6/2022 | Young | G06F 21/64 |

* cited by examiner

*Primary Examiner* — Greta L Robinson
(74) *Attorney, Agent, or Firm* — Jackson Walker L.L.P.

(57) ABSTRACT

An information handling system may include a processor and a management controller configured to provide out-of-band management facilities for management of the information handling system, the management controller further configured to, in response to a triggering event for collecting a hardware inventory, collect identifying information for information handling resources of the information handling system and a location for each of the information handling resources, order the identifying information in accordance with a schema for ordering the identifying information, concatenate the identifying information into a string in accordance with the schema, generate a signature from the string, compare the signature to an existing inventory signature for the information handling system, and generate a notification in response to the signature mismatching the existing inventory signature.

15 Claims, 2 Drawing Sheets

SYSTEMS AND METHODS FOR INVENTORY COLLECTION IN A MANAGEMENT CONTROLLER

TECHNICAL FIELD

The present disclosure relates in general to information handling systems, and more particularly to systems and methods for inventory collection in a management controller of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Users and/or administrators of an information handling system may desire to be aware of when changes are made to a hardware inventory of an information handling system. However, in traditional information handling system, when a hardware inventory of an information handling system changes while the information handling system is powered down or during a hot plug, no notifications are communicated to a user and/or administrator regarding the change in hardware inventory.

SUMMARY

In accordance with the teachings of the present disclosure, the disadvantages and problems associated with managing hardware inventory of an information handling system may be reduced or eliminated.

In accordance with embodiments of the present disclosure, an information handling system may include a processor and a management controller configured to provide out-of-band management facilities for management of the information handling system, the management controller further configured to in response to a triggering event for collecting a hardware inventory, collect identifying information for information handling resources of the information handling system and a location for each of the information handling resources, order the identifying information in accordance with a schema for ordering the identifying information, concatenate the identifying information into a string in accordance with the schema, generate a signature from the string, compare the signature to an existing inventory signature for the information handling system, and generate a notification in response to the signature mismatching the existing inventory signature.

In accordance with these and other embodiments of the present disclosure, a method may include in response to a triggering event for collecting a hardware inventory, collecting, by a management controller configured to provide out-of-band management facilities for management of an information handling system, identifying information for information handling resources of the information handling system and a location for each of the information handling resources. The method may also include ordering, by the management controller, the identifying information in accordance with a schema for ordering the identifying information. The method may also include concatenating, by the management controller, the identifying information into a string in accordance with the schema. The method may additionally include generating, by the management controller, a signature from the string. The method may further include comparing, by the management controller, the signature to an existing inventory signature for the information handling system. The method may also include generating, by the management controller, a notification in response to the signature mismatching the existing inventory signature.

In accordance with these and other embodiments of the present disclosure an article of manufacture may include a computer readable medium and computer-executable instructions carried on the computer readable medium, the instructions readable by a processor, the instructions, when read and executed, for causing the processor to, in a management controller configured to provide out-of-band management facilities for management of an information handling system: (a) in response to a triggering event for collecting a hardware inventory, collect identifying information for information handling resources of the information handling system and a location for each of the information handling resources; (b) order the identifying information in accordance with a schema for ordering the identifying information; (c) concatenate the identifying information into a string in accordance with the schema; (d) generate a signature from the string; (e) compare the signature to an existing inventory signature for the information handling system; and (f) generate a notification in response to the signature mismatching the existing inventory signature.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
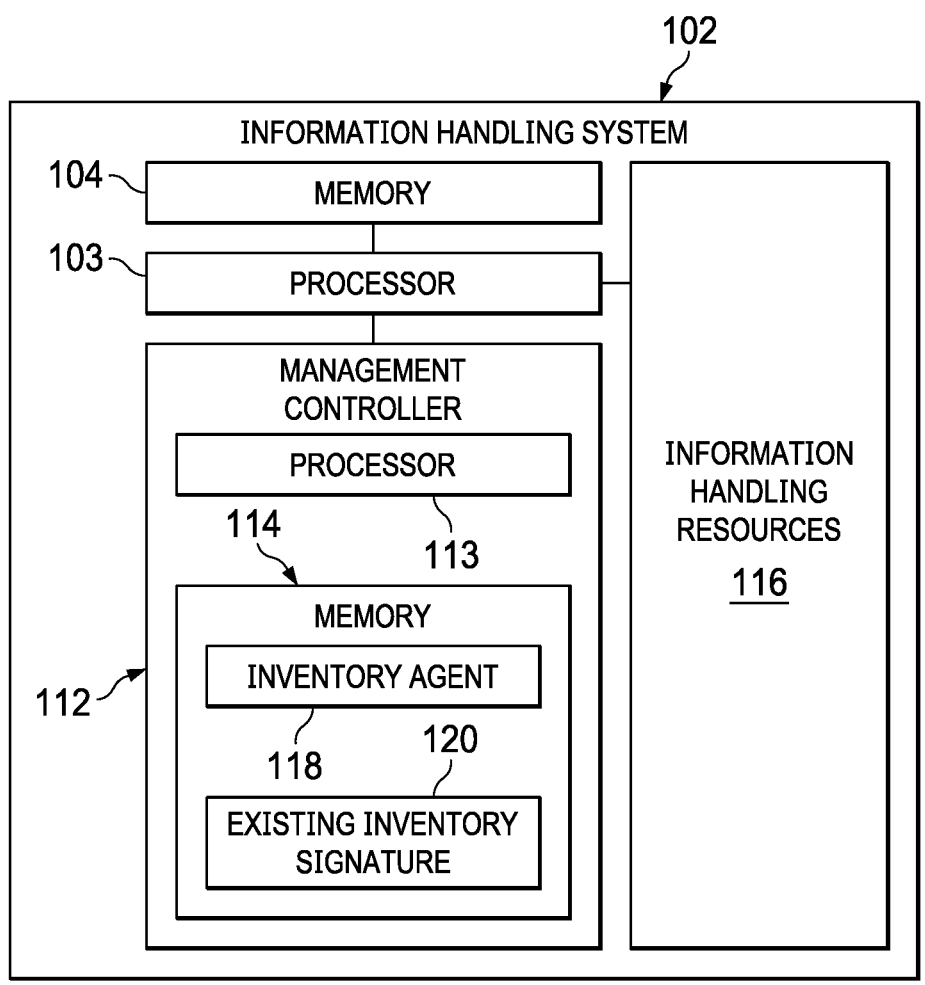
FIG. 1 illustrates a block diagram of an example information handling system, in accordance with embodiments of the present disclosure.
Figure 2:
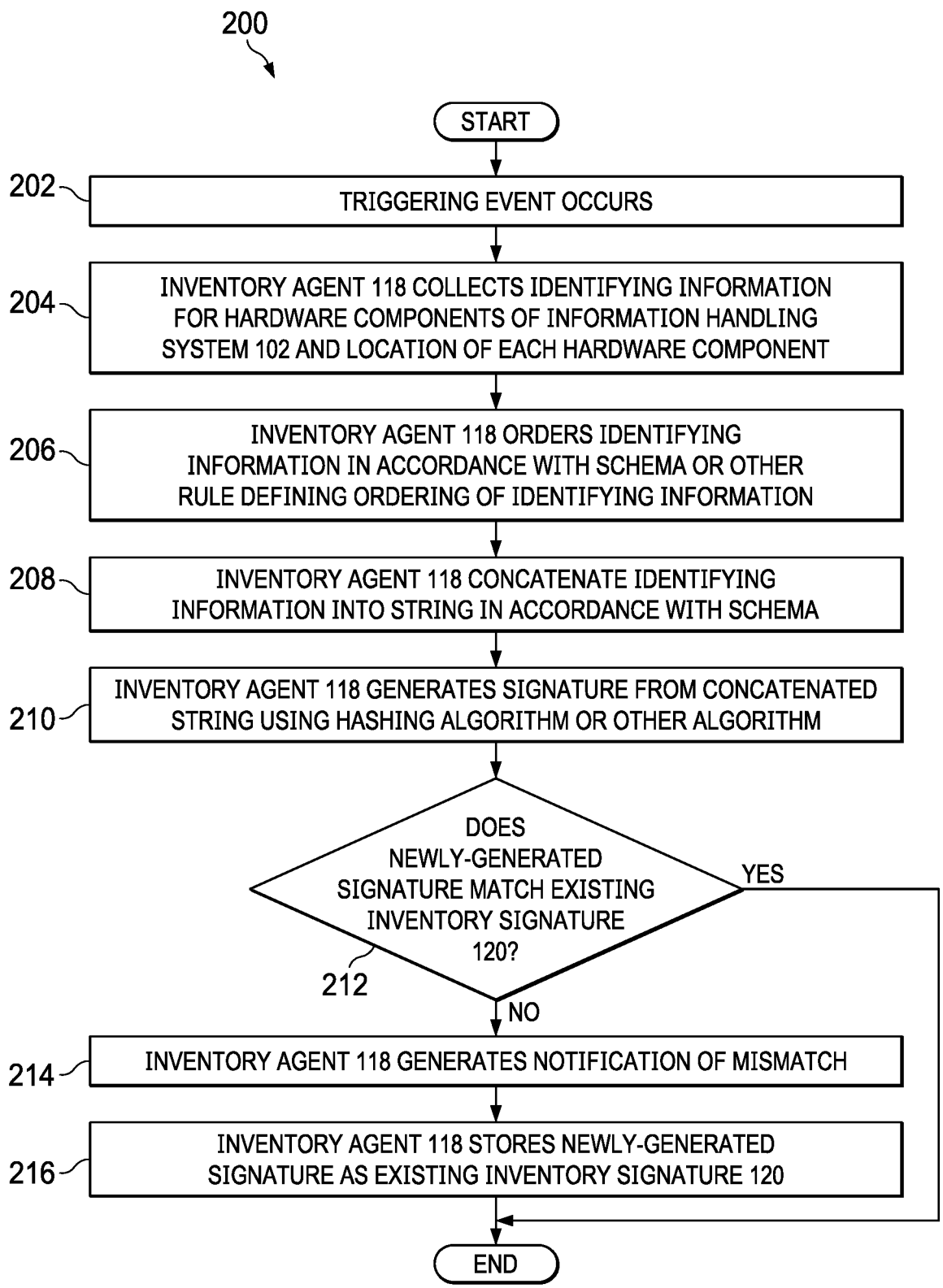
FIG. 2 illustrates a flow chart of an example method for inventory collection by a management controller of an information handling system, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a server. In other embodiments, information handling system 102 may be a personal computer (e.g., a desktop computer, a laptop, notebook, tablet, handheld, smart phone, personal digital assistant, etc.). As depicted in FIG. 1, information handling system 102 may include a processor 103, a memory 104 communicatively coupled to processor 103, a management controller 112 communicatively coupled to processor 103, and one or more information handling resources 116 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Management controller 112 may be configured to provide out-of-band management facilities for management of information handling system 102. Such management may be made by management controller 112 even if information handling system 102 is powered off or powered to a standby state. Management controller 112 may include a processor 113, memory 114, and an out-of-band network interface separate from and physically isolated from an in-band network interface. In certain embodiments, management controller 112 may include or may be an integral part of a baseboard management controller (BMC), a remote access controller (e.g., a Dell Remote Access Controller of Integrated Dell Remote Access Controller), or an enclosure controller. In other embodiments, management controller 112 may include or may be an integral part of a chassis management controller (CMC).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in computer-readable media of information handling system 102 or management controller 112 (e.g., memory 114). As shown in FIG. 1, processor 113 may be communicatively coupled to processor 103. Such coupling may be via a Universal Serial Bus (USB), System Management Bus (SMBus), general purpose input/output (GPIO) channel and/or one or more other communications channels.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off. Memory 114 may have stored thereon software and/or firmware which may be read and executed by processor 113 for carrying out the functionality of management controller 112. As shown in FIG. 1, memory 114 may have stored thereon inventory agent 118 and existing inventory signature 120.

As described in greater detail elsewhere in this disclosure, inventory agent 118 may include any system, device, or apparatus configured to obtain a hardware inventory of one or more hardware components of information handling system 102 (e.g., processor 103, memory 104, management controller 112, other information handling resources 116, etc.), generate a signature (e.g., hash) indicative of the inventory, and store such signature as existing inventory signature 120. In addition, upon each startup of information handling system 102 (e.g., after powering on or reset of information handling system 102), inventory agent 118 may obtain a hardware inventory of information handling resources 116 of information handling system 102, generate a new signature, and compare such new signature against existing inventory signature 120 to determine if any change has occurred to the hardware inventory of information handling system 102. In some embodiments, inventory agent 118 may be implemented as a program of instructions that may be read by and executed on processor 103 to carry out the functionality of inventory agent 118.

Existing inventory signature 120 may include a signature (e.g., hash) representing identifying information of one or more components of hardware (e.g., processor 103, memory 104, management controller 112, other information handling resources 116, etc.). For example, as described in greater detail below, existing inventory signature 120 may be created by concatenating identifying information regarding each hardware component in a defined order and then applying a hash function to the concatenated information to generate existing inventory signature 120. Such identifying information for each hardware component may include serial numbers, service tags, media access control addresses, and/or any other uniquely-identifying information.

Generally speaking, information handling resources 116 may include any component system, device or apparatus of information handling system 102, including without limitation processors, buses, computer-readable media, input-output devices and/or interfaces, storage resources, network interfaces, motherboards, electro-mechanical devices (e.g., fans), displays, and/or power supplies.

FIG. 2 illustrates a flow chart of an example method 200 for inventory collection by management controller 112, in accordance with embodiments of the present disclosure. According to one embodiment, method 200 may begin at step 202. As noted above, teachings of the present disclosure may be implemented in a variety of configurations of information handling system 102.

At step 202, a triggering event for inventory collection may occur. In some embodiments, such triggering event may include a start-up (e.g., powering on, reboot, reset) of information handling system 102. In these and other embodiments, such triggering event may include a hot plug insertion or removal of an information handling resource.

At step 204, inventory agent 118 may collect identifying information for hardware components of information handling system 102 and the location (e.g., slot, port, etc.) of each hardware component.

At step 206, inventory agent 118 may order the identifying information in accordance with a schema or other rule defining ordering of the identifying information. The schema may define an order in which the identifying information of the various hardware components are arranged in order to create an input string for a hashing function. For example, the schema may define that identifying information of memory devices is to be ordered before identifying information of network devices. For multiple instances of the same type of device (e.g., memory modules), the scheme may also identify how the identifying information for the multiple instances is to be ordered. For example, the schema may define that memory modules are to be ordered based on the slot numbers in which the memory modules are inserted. In the case of an empty slot, port, or other location, 0 or another predefined constant may be used as identifying information.

At step 208, inventory agent 118 may concatenate the identifying information into a string in accordance with the schema. In some embodiments, locations associated with the identifying information may also be concatenated in accordance with the schema.

At step 210, inventory agent 118 may generate a signature (e.g., hash) from the concatenated string using any suitable hashing algorithm or other algorithm.

At step 212, inventory agent 118 may determine whether the newly-generated signature matches existing inventory signature 120. If the newly-generated signature matches existing inventory signature 120, method 200 may end. Otherwise, method 200 may proceed to step 214.

At step 214, in response to the newly-generated signature differing from existing inventory signature 120, inventory agent 118 may generate a notification of the mismatch, thus indicating a change in hardware inventory. Such notification may be made via a graphical user interface, a speaker or other sound-generating component, a management console communicatively coupled to management controller 112, and/or in any other suitable manner.

At step 216, inventory agent 118 may store the newly-generated signature as existing inventory signature 120. After completion of step 216, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a processor; and
   a management controller configured to provide out-of-band management facilities for management of the information handling system, the management controller further configured to:
   in response to a triggering event for collecting a hardware inventory, collect identifying information for information handling resources of the information handling system and a location for each of the information handling resources;
   order the identifying information in accordance with a schema for ordering the identifying information;
   concatenate the identifying information into a string in accordance with the schema;
   generate a signature from the string;
   compare the signature to an existing inventory signature for the information handling system; and
   generate a notification in response to the signature mismatching the existing inventory signature.

2. The information handling system of claim 1, wherein the management controller is further configured to store the signature as the existing inventory signature in response to the signature mismatching the existing inventory signature.

3. The information handling system of claim 1, wherein the trigger comprises a startup of the information handling system.

4. The information handling system of claim 1, wherein the trigger comprises a hot swap of an information handling resource.

5. The information handling system of claim 1, wherein generating the signature from the string comprises performing a hash algorithm on the string.

6. A method comprising:
   in response to a triggering event for collecting a hardware inventory, collecting, by a management controller configured to provide out-of-band management facilities for management of an information handling system, identifying information for information handling resources of the information handling system and a location for each of the information handling resources;
   ordering, by the management controller, the identifying information in accordance with a schema for ordering the identifying information;
   concatenating, by the management controller, the identifying information into a string in accordance with the schema;
   generating, by the management controller, a signature from the string;
   comparing, by the management controller, the signature to an existing inventory signature for the information handling system; and
   generating, by the management controller, a notification in response to the signature mismatching the existing inventory signature.

7. The method of claim 6, further comprising storing, by the management controller, the signature as the existing inventory signature in response to the signature mismatching the existing inventory signature.

8. The method of claim 6, wherein the trigger comprises a startup of the information handling system.

9. The method of claim 6, wherein the trigger comprises a hot swap of an information handling resource.

10. The method of claim 6, wherein generating the signature from the string comprises performing a hash algorithm on the string.

11. An article of manufacture comprising:
    a computer readable medium; and
    computer-executable instructions carried on the computer readable medium, the instructions readable by a processor, the instructions, when read and executed, for causing the processor to, in a management controller configured to provide out-of-band management facilities for management of an information handling system:
    in response to a triggering event for collecting a hardware inventory, collect identifying information for information handling resources of the information handling system and a location for each of the information handling resources;
    order the identifying information in accordance with a schema for ordering the identifying information;
    concatenate the identifying information into a string in accordance with the schema;
    generate a signature from the string;
    compare the signature to an existing inventory signature for the information handling system; and
    generate a notification in response to the signature mismatching the existing inventory signature.

12. The information handling system of claim 11, the instructions for further causing the processor to, in the management controller, store the signature as the existing inventory signature in response to the signature mismatching the existing inventory signature.

13. The information handling system of claim 11, wherein the trigger comprises a startup of the information handling system.

14. The information handling system of claim 11, wherein the trigger comprises a hot swap of an information handling resource.

15. The information handling system of claim 11, wherein generating the signature from the string comprises performing a hash algorithm on the string.

\* \* \* \* \*